No. 717,168. Patented Dec. 30, 1902.
O. E. CONE.
READING CHART.
(Application filed Apr. 3, 1902.)
(No Model.)
Fig. 1.
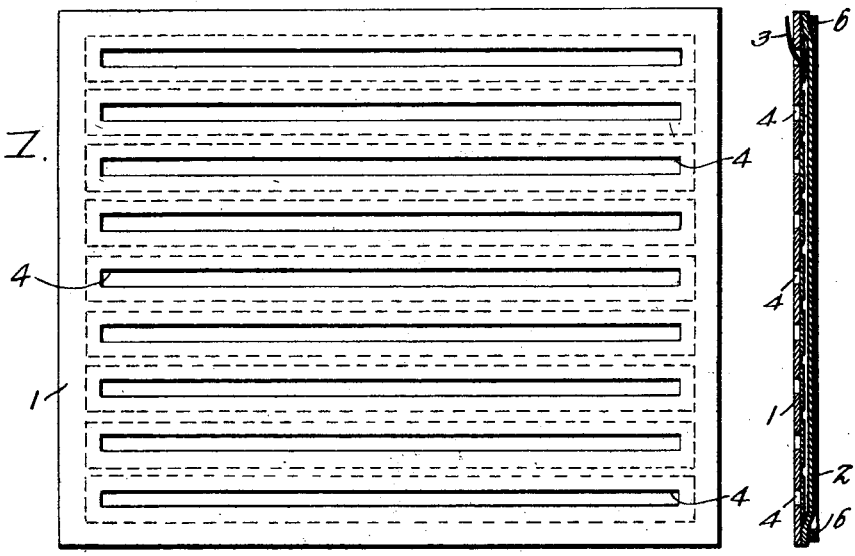
Fig. 2.
Fig. 4.
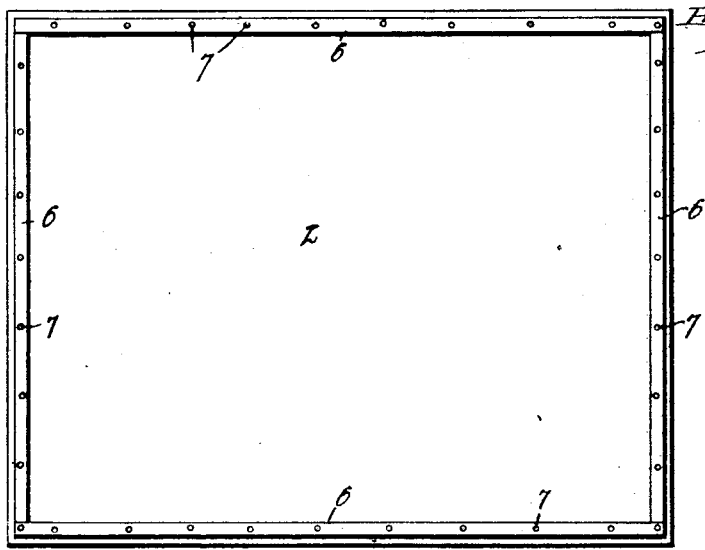
Fig. 3.
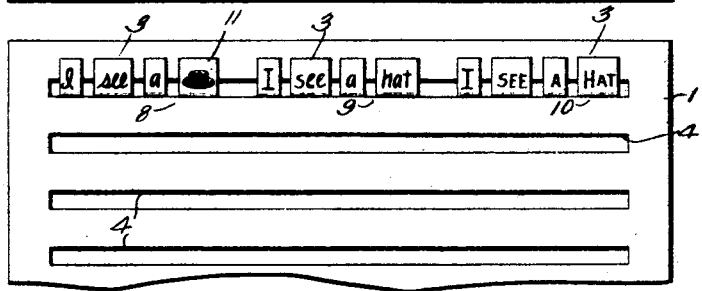
Witnesses:
E. F. Stewart
R. M. Elliott
O. E. Cone, Inventor:
by C. A. Snow & Co
Attorneys.
THE NORRIS PETERS CO., PHOTO-LITHO., WASHINGTON, D. C.

UNITED STATES PATENT OFFICE.

OLIVE E. CONE, OF KANSAS CITY, MISSOURI.

READING-CHART.

SPECIFICATION forming part of Letters Patent No. 717,168, dated December 30, 1902.

Application filed April 3, 1902. Serial No. 101,296. (No model.)

*To all whom it may concern:*

Be it known that I, OLIVE E. CONE, a citizen of the United States, residing at Kansas City, in the county of Jackson and State of Missouri, have invented a new and useful Reading-Chart, of which the following is a specification.

This invention relates generally to educational appliances, and particularly to a reading-chart for use by teachers in primary schools.

The objects of the invention are to provide a means for the rapid formation of written or printed sentences, to enable the teacher to effect a rapid change of sentences, thus presenting a variety of reading matter and exhibiting both old and new words in many different positions, thus to prevent a child from committing the sentences to memory and recognizing the words only when seen in certain positions, to render possible a rapid word drill by quickly changing the position of the cards upon which the words or objects are printed, to effect a saving of time for the teacher, who cannot possibly in the few minutes allotted to the average reading lesson either print or write in correct form with sufficient rapidity to present the desired variety of sentences necessary to enable a child to recognize at sight in any position in which they may be placed the words that he has been taught, and, finally, to secure more correct and fluent reading in the primary school.

With these and other objects in view, as will appear as the nature of the invention is better understood, the same consists in the novel construction and combination of parts of a reading-chart, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assembling without departing from the spirit thereof.

In the drawings, Figure 1 is a view in elevation taken from the front of a chart constructed in accordance with the present invention. Fig. 2 is a similar view taken from the rear. Fig. 3 is a view in elevation of a portion of the front of the chart, showing the manner in which sentences are exhibited to the pupil. Fig. 4 is a view in vertical transverse section.

The chart comprises a front or card support 1, which may be constructed of any suitable material, preferably of heavy cardboard, a back 2 of the same material, and cards 3, bearing words, letters, and objects. The front is provided with a plurality of longitudinal slots 4, disposed, by preference, at regular intervals apart, and back of these slots are pasted strips 5 of any suitable flexible or textile material, the point of attachment of the strips with the front being a sufficient distance below the upper edges of the slots to present pockets of requisite depth to hold the cards 3 in position for exhibition and to permit of their being readily shifted or removed without any binding action. The back 2, which operates as a reinforce for the pockets to prevent their disconnection in use and also to impart the requisite rigidity to the structure, is reinforced by marginal battens 6, secured in position by suitable fastening devices, as tacks 7, these battens operating to prevent the structure as a whole from warping.

The cards 3 are to bear letters, words, and objects, and the letters are to be printed in different styles of type—as, for example, in script letters—as shown in the group of cards designated 8, lower-case letters, as shown in the group of cards designated 9, and upper-case letters, as shown in the group of cards designated 10. One of the cards 11 in the group 8 is shown as provided with the representation of a hat, it being understood that other cards of the same or the other groups may bear representations of other objects to be employed in teaching a child the word represented by the object. In as far as permissible it is designed that one side of a card shall bear a symbol representing the word on its opposite side. Thus, for example, the card 11 that bears the representation of a hat on one side will have on the opposite side the word "Hat," and the card exhibiting the pronoun "I" will have on the opposite side the representation of a human eye.

In use the device is to be hung upon a wall, and being light in weight may be easily moved from one point to another. By reason of the simplicity of its construction it can be manufactured and sold at a price that will put it within the reach of all persons desiring such an appliance.

Having thus fully described my invention, what I claim as new, and desire to secure by Letters Patent, is—

1. An appliance of the character specified, comprising a flat front provided with a plurality of longitudinal slots, flexible strips secured to the rear side of the front above and below the walls of the slots and constituting pockets, and a backing covering the pockets.

2. An appliance of the character specified, comprising a flat front provided with a plurality of longitudinal slots, flexible strips secured to the rear side of the front above and below the walls of the slots and constituting pockets, and marginal reinforces secured to the back.

3. An appliance of the character specified, comprising a flat front provided with a plurality of longitudinal slots, flexible strips secured to the rear side of the front above and below the walls of the slots and constituting pockets, and cards to be associated with the pockets and to be arranged in groups and printed in different styles of type such as script, upper-case, lower-case, &c.

4. An appliance of the character specified, comprising a flat front provided with a plurality of longitudinal slots, flexible strips secured to the rear side of the front above and below the walls of the slots and constituting pockets, and cards to be detachably associated with the pockets and bearing letters and words printed in different styles of type, certain of the cards bearing on one side a representation or symbol of the word on the opposite side.

OLIVE E. CONE.

Witnesses:
ALBERT EVANS,
ADDA M. GRAHAM.